US011388544B2

(12) United States Patent
Holm et al.

(10) Patent No.: US 11,388,544 B2
(45) Date of Patent: Jul. 12, 2022

(54) PORTABLE COMPUTING DEVICE ASSISTED MUSTERING

(71) Applicant: CARRIER CORPORATION, Jupiter, FL (US)

(72) Inventors: Ben Holm, Farmington, NY (US); Ed Gauthier, Fairport, NY (US); Eric Hartman, Pittsford, NY (US); Shawn Parslow, Fishers, IN (US); Zach Roth, Rochester, NY (US); Kimberly Blum, Fairport, NY (US); Anh Gauthier, Fairport, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 197 days.

(21) Appl. No.: 16/489,320

(22) PCT Filed: Mar. 7, 2018

(86) PCT No.: PCT/US2018/021340

§ 371 (c)(1),
(2) Date: Aug. 27, 2019

(87) PCT Pub. No.: WO2018/165297

PCT Pub. Date: Sep. 13, 2018

(65) Prior Publication Data

US 2020/0068338 A1 Feb. 27, 2020

Related U.S. Application Data

(60) Provisional application No. 62/468,610, filed on Mar. 8, 2017.

(51) Int. Cl.
*H04W 4/02* (2018.01)
*H04W 4/60* (2018.01)
(Continued)

(52) U.S. Cl.
CPC .............. *H04W 4/02* (2013.01); *G06F 21/53* (2013.01); *G06F 21/566* (2013.01); *G08B 7/066* (2013.01);
(Continued)

(58) Field of Classification Search
CPC ........... H04W 4/02; H04W 4/60; G06F 21/53; G06F 21/566; G08B 7/066; G08B 25/014; G08B 27/001
See application file for complete search history.

(56) References Cited

U.S. PATENT DOCUMENTS 8,401,514 B2 3/2013 Ebdon et al.
8,907,763 B2 * 12/2014 Pineau .................... G06F 21/34 340/5.61

(Continued)

FOREIGN PATENT DOCUMENTS

CN 102526919 A 7/2012
CN 102739786 A 10/2012

(Continued)

OTHER PUBLICATIONS

Anonymous, "Safety Connection Protecting Employees Wherever They are Working", retrieved Online URL: <https://www.everbridge.com/product/safety-connection/>, 12 pages.

(Continued)

*Primary Examiner* — Srilakshmi K Kumar
*Assistant Examiner* — Umair Ahsan
(74) *Attorney, Agent, or Firm* — Cantor Colburn LLP

(57) ABSTRACT

A tool for supporting mustering in a facility is provided. The tool includes a mobile computing device comprising a display unit, a memory and a processor. The memory has executable instructions of an application stored thereon, which, when executed, cause the processor to communicate with monitoring and control systems of the facility, to
(Continued)

conduct a registration of the user of the mobile computing device and to display on the display unit an interface. The interface includes a first interface element by which the user indicates his/her safety level, a second interface element by which the user self-identifies as a mayor and a map. The map includes first information received from the monitoring and control systems, second information relating to predefined static muster points and third information relating to dynamic muster points of users self-identifying as mayors.

20 Claims, 6 Drawing Sheets

(51) Int. Cl.

| | |
|---|---|
| ***G08B 7/06*** | (2006.01) |
| ***G08B 25/01*** | (2006.01) |
| ***G08B 27/00*** | (2006.01) |
| ***G06F 21/53*** | (2013.01) |
| ***G06F 21/56*** | (2013.01) |

(52) U.S. Cl.

CPC ......... *G08B 25/014* (2013.01); *G08B 27/001* (2013.01); *H04W 4/60* (2018.02)

(56) References Cited

U.S. PATENT DOCUMENTS

| | | | | |
|---|---|---|---|---|
| 9,324,120 | B2 | 4/2016 | Braun | |
| 2006/0223518 | A1* | 10/2006 | Haney ............... | H04M 1/72457 455/420 |
| 2007/0210910 | A1 | 9/2007 | Norstrom et al. | |
| 2010/0282839 | A1 | 11/2010 | Zura et al. | |
| 2011/0136463 | A1* | 6/2011 | Ebdon ................... | G08B 7/066 455/404.1 |
| 2015/0228183 | A1 | 8/2015 | Rothkopf et al. | |

FOREIGN PATENT DOCUMENTS

| | | | |
|---|---|---|---|
| CN | 104759042 | A | 7/2015 |
| CN | 105050043 | A | 11/2015 |
| CN | 105513232 | A | 4/2016 |
| CN | 106323287 | A | 1/2017 |
| CN | 106408808 | A | 2/2017 |
| CN | 106415618 | A | 2/2017 |
| CN | 106463027 | A | 2/2017 |
| WO | 2007019611 | A1 | 2/2007 |
| WO | 2015192916 | A1 | 12/2015 |

OTHER PUBLICATIONS

Anonymous, "Automatic Mustering & Personnel Location System", Extronics, 2013, retrieved online URL: <http://www.extronics.com/media/223185/automatic%20mustering%20and%20personnel%20location%20system%20-%2007-Nov. 2013.pdf>, 50 pages.

Anonymous, "Dynamic Evacuation Routes for Personnel on a Naval Ship", retrieved online URL:<http://onlinelibrary.wiley.com/doi/10.1002/nav.20314/abstract?systemMessage=WOL+Usage+report+download+page+will+be+unavailable+on+Friday+27th+January+2017+at+23%3A00+GMT%2F+18%3A00+EST%2F+07%3A00+SGT+%28Saturday+28th+Jan+for+SGT%29++for+up+to+2+hours+due+>, 3 pages.

Anonymous, "Emergency Mustering", retrieved online URL:<https://telaeris.com/xpressentry-emergency-mustering/>, 5 pages.

Anonymous, "Evacuation Procedures & Designated Assembly Points", retrieved online URL<https://www.potsdam.edu/about/physicalplant/evacuationplans/procedures>, 4 pages.

Anonymous, "RFID Mustering Solutions", retrieved online URL:<http://www.radiantrfid.com/employee-mustering.html>, 2 pages.

Anonymous, "Systems Integration—Integrating Building Systems to Optimize Building Operations", retrieved online URL: <https://www.houle.ca/services-and-solutions/systems-integration/>, 5 pages.

ISR/WO, dated Jun. 11, 2018, U300993PCT.

Radianti et al, "A Spatio-Temporal Probabilistic Model of Hazard-and Crowd Dynamics for Evacuation Planning in Disasters", 2014, retrieved online URL: <https://pdfs.semanticscholar.org/ee7b/dffd72e001dee50b5d60bc2406c524aa537b.pdf?_ga=1.87653407.689813310.1482469038>, 13 pages.

IPRP; dated Sep. 19, 2019; pp. 8.

* cited by examiner

FIG. 1
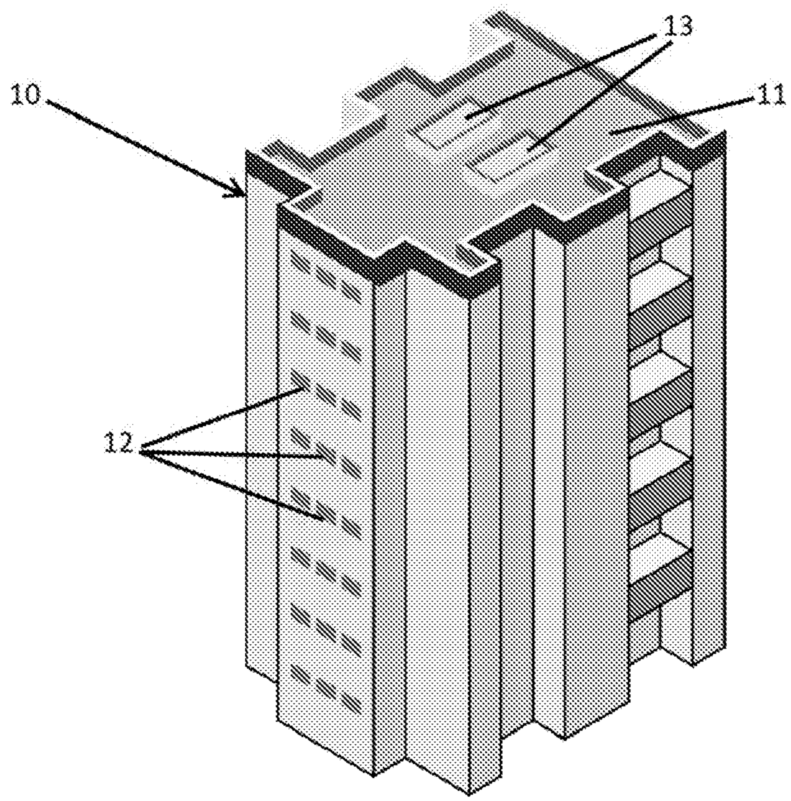
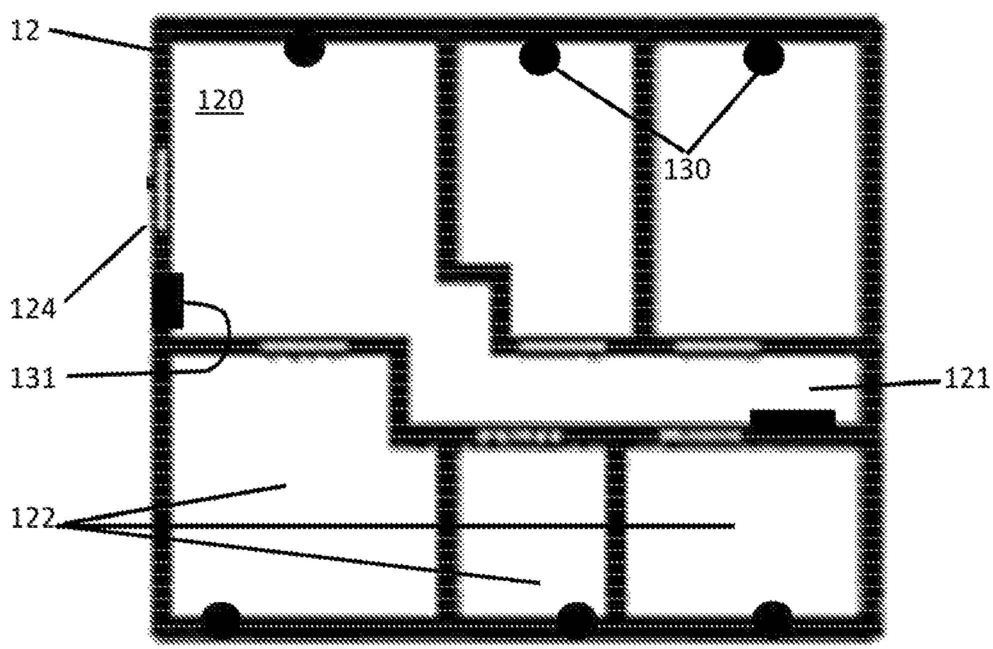
FIG. 2

PORTABLE COMPUTING DEVICE ASSISTED MUSTERING

CROSS-REFERENCE TO RELATED APPLICATIONS

This application claims the benefit of PCT/US2018/021340 filed Mar. 7, 2018, which claims priority to U.S. Provisional Application No. 62/468,610 filed Mar. 8, 2017, which is incorporated herein by reference in its entirety.

BACKGROUND

The following description relates to portable computing device assisted mustering and, more particularly, to dynamic portable computing device assisted mustering for use by building occupants.

Building management is becoming both increasingly sophisticated and more reliant on automation. Structures are regularly fitted with many sensors and controllers that send vast amounts of data to building automation systems (BASs). Traditionally, monitoring and control systems for energy management, security and safety coexist as separate subsystems with little cooperation between them. However, demand for more robust and interoperable systems is increasing because such robust and interoperable systems result in more optimal and effective deployments of equipment which reduce the number of required devices, energy consumption and cost. As an example of a robust and interoperable system, a self-organizing, cooperative and robust building automation (SCUBA) project has been developed and implements a building management framework and provides services and tools to support distributed, energy-aware, self-organizing, robust and cooperative monitoring and control systems.

Fire is one of the most common emergency events for a building. It can spread rapidly, burn intensely, carry strong heat and produce large volumes of fumes and smoke. Fire can prevent evacuees from escaping buildings by obstructing exits and can inflict casualties and cause loss of life. For early fire detection and suppression, building standards require installation of fire alarms, smoke detectors, carbon monoxide detectors and firefighting equipment, such as extinguishers, fire blankets and sprinkler systems. Standard fire safety systems are connected to a central panel that triggers the alarm and provides status information while alarm systems including strobe lights, lighted exit signs and sirens alert occupants and guide them to the nearest exit.

In addition to fire safety systems, commercial and public buildings often have mayors on hand to coordinate building evacuation processes in the event of a fire by assisting evacuees, using firefighting and suppression equipment and relaying information to first responders. Mayors are typically volunteers or persons employed in a building for a specific purpose and are often tasked with multiple duties including, but not limited to, mustering evacuees in a safe location during a fire or other emergency. The mayors' ability to effectively muster evacuees tends to have a huge impact on how the evacuation proceeds and the emergency event's ultimate outcome.

BRIEF DESCRIPTION

According to one aspect of the disclosure, a tool for supporting mustering in a facility is provided. The tool includes a mobile computing device comprising a display unit, a memory and a processor. The memory has executable instructions of an application stored thereon, which, when executed, cause the processor to communicate with monitoring and control systems of the facility, to conduct a registration of the user of the mobile computing device and to display on the display unit an interface. The interface includes a first interface element by which the user indicates his/her safety level, a second interface element by which the user self-identifies as a mayor and a map. The map includes first information received from the monitoring and control systems, second information relating to predefined static muster points and third information relating to dynamic muster points of users self-identifying as mayors.

In accordance with additional or alternative embodiments, the mobile computing device includes a smartphone, a tablet and a laptop.

In accordance with additional or alternative embodiments, the mobile computing device is plural in number and is provided as at least one mobile computing device for each user in the facility.

In accordance with additional or alternative embodiments, the registration of the user includes a recordation of identification thereof.

In accordance with additional or alternative embodiments, for each user self-identifying as a mayor, the map further includes an illustration of the identifications of other users at map locations corresponding to actual locations thereof.

In accordance with additional or alternative embodiments, the first interface allows the user to indicate his/her danger level and health status.

In accordance with additional or alternative embodiments, the first information includes structural data which is displayable as a plan of the facility in the map and environmental condition data of the predefined static and dynamic muster points which is displayable as guidance relative to the plan for the user.

In accordance with additional or alternative embodiments, the second information includes a location of the predefined static muster points relative to the plan and the third information includes a location and a vector of the dynamic muster points relative to the plan.

In accordance with additional or alternative embodiments, for at least each user self-identifying as a mayor, the interface further includes a user check-in element and user-mayor, mayor-mayor and mayor-first responder communication engaging elements.

According to another aspect of the disclosure, a tool for supporting dynamic mustering in a facility having monitoring and control systems is provided. The tool includes multiple mobile computing devices respectively including a display unit, a memory and a processor. The memory of each of the multiple mobile computing devices has executable instructions of a distributed application stored thereon, which, when executed, cause the corresponding processor to communicate with the monitoring and control systems, to conduct a registration of the corresponding user and to display on the corresponding display unit an interface. The interface includes a first interface element by which the corresponding user indicates his/her safety level, a second interface element by which the corresponding user self-identifies as a mayor and a map. The map includes first information received from the monitoring and control systems, second information relating to predefined static muster points and third information relating to dynamic muster points of users self-identifying as mayors.

In accordance with additional or alternative embodiments, the multiple mobile computing devices include smartphones, tablets and laptops.

In accordance with additional or alternative embodiments, the registration of the corresponding user includes a recordation of identification thereof.

In accordance with additional or alternative embodiments, for each user self-identifying as a mayor, the map further includes an illustration of the identifications of other users at map locations corresponding to actual locations thereof.

In accordance with additional or alternative embodiments, the first interface allows the corresponding user to indicate his/her danger level and health status.

In accordance with additional or alternative embodiments, the first information includes structural data which is displayable as a plan of the facility in the map and environmental condition data of the predefined static and dynamic muster points which is displayable as guidance relative to the plan for the corresponding user.

In accordance with additional or alternative embodiments, the second information includes a location of the predefined static muster points relative to the plan and the third information includes a location and a vector of the dynamic muster points relative to the plan.

In accordance with additional or alternative embodiments, for at least each user self-identifying as a mayor, the interface further includes a user check-in element and user-mayor, mayor-mayor and mayor-first responder communication engaging elements.

According to yet another aspect of the disclosure, a method of supporting mustering in a facility is provided. The method includes engaging communications with monitoring and control systems of the facility, registering users in the facility and displaying an interface on mobile computing devices of the users such that each displayed interface includes a first interface element by which the corresponding user indicates his/her safety level, a second interface element by which the corresponding user self-identifies as a mayor and a map. The map includes first information received via the communications with the monitoring and control systems, second information relating to predefined static muster points and third information relating to dynamic muster points of users self-identifying as mayors.

In accordance with additional or alternative embodiments, the first information includes structural data which is displayable as a plan of the facility in the map and environmental condition data of the predefined static and dynamic muster points which is displayable as guidance relative to the plan for the user, the second information includes a location of the predefined static muster points relative to the plan and the third information includes a location and a vector of the dynamic muster points relative to the plan.

In accordance with additional or alternative embodiments, for at least each user self-identifying as a mayor, the interface further includes a user check-in element and user-mayor, mayor-mayor and mayor-first responder communication engaging elements.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a perspective view of a facility provided as an office building with multiple floors;

FIG. 2 is a top down view of a floor plan of a building such as the building of FIG. 1;

DETAILED DESCRIPTION

Figure 3:
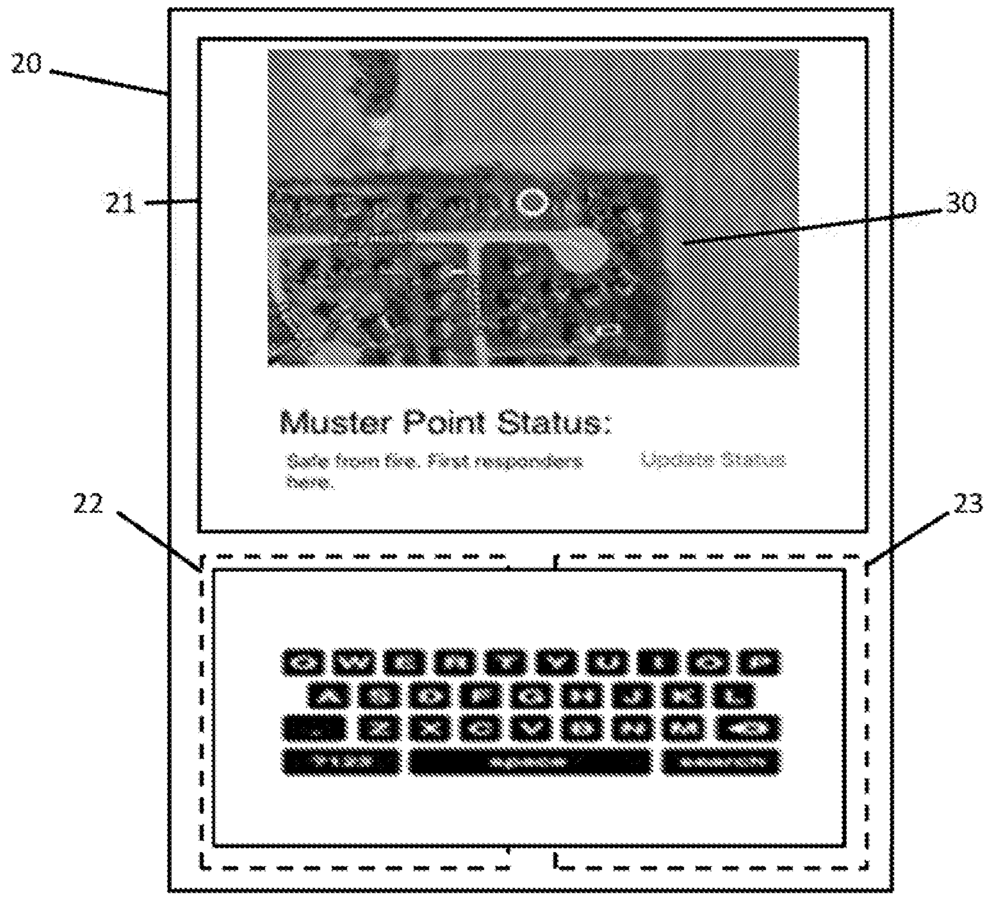
FIG. 3 is a schematic diagram illustrating components of a portable or mobile computing device.

Current access control systems have certain issues with respect to building mayors being successful in their duties of mustering evacuees. These include, the fact that a mustering location is usually a static location and that it is generally assumed that evacuees should gather at a particular, well-known location even though this location may not be reachable or safe. Meanwhile, instructions to proceed to backup locations might not be well communicated or well understood. Another issue relates to hardware dependency in that current "mobile" solutions rely on a mobile credential reader to scan badges in order to check in mustering people. Here, because the hardware is often customized, availability can be low and thus limited redundancy and training can prevent solutions from being used during a muster if a piece of hardware is broken or an operator is incapacitated. In addition, badge-reading solutions do not provide any ability to track un-badged individuals. Yet another issue deals with the problem of zero or lack of communications. That is, while mustering in an emergency event, current solutions do not provide for status updates of either muster points or mustering individuals. Furthermore, there is often no ability to gather situational awareness to inform mustering decisions and therefore alternate systems must be employed, such as intercoms or mass notification systems.

With the above in mind, a portable computing device assisted mustering system is provided to in part address the limitations of current mustering systems by leveraging with portable computing devices (e.g., smart mobile devices). As will be described below, individuals (referred to as residents) in a building or campus (referred to as a facility) would have a phone-based mustering application installed for that facility. The mustering application will connect to the access control system and allow each user to register their identity.

This may be a badge ID, visitor ID or some other indicator used by the system to track resident presence in non-emergency situations.

When a resident of the facility needs to muster for an emergency, they would open the application and see a local map indicating the predefined muster points. That resident and other residents could then use the application to indicate they are in danger or injured while certain users, such as emergency response team members or mayors could use the application to register as a dynamic muster point. The mayors could indicate their safety level and other status points, such as first aid availability, so that other users and non-mayors would see the new muster points appear on their own applications and thus move to the new dynamic muster points if their predefined muster point has been compromised. In addition, mayors may have a different view in the application that would show all the residents who had not yet mustered. Communications of status and locations happen dynamically as residents and mayors move around, call for help or move to safety.

When a resident moves close to a mayor, the mayor is able to check-in the resident through application-to-application communications. Possible communication would include a photo scan of the resident's ID, NFC, airdrop communications or similar phone-to-phone communications. This check-in activity will be reported back to the access control system, so accurate records of movement and access are maintained throughout the emergency.

Therefore, with reference to FIGS. 1 and 2, a tool for supporting dynamic mustering in a facility 10 is provided. The facility 10 may be a building, such as a commercial office building or a residential building (see FIGS. 1 and 2), or a campus on which various structures including buildings are built (see FIGS. 4-14). Where the facility 10 is or includes a commercial, multi-floor office building 11, the commercial multi-floor office building 11 includes multiple floors 12 and various monitoring and control systems 13 (see FIG. 1). As shown in FIG. 2, each floor 12 has a floor plan 120 that includes one or more hallways 121, one or more rooms 122 off the hallways 121, elevator or escalator bays and emergency exits 124. The various monitoring and control systems 13 are provided on each floor 12 and include environmental condition detectors 130 (e.g., smoke, fire and carbon monoxide detectors) and environmental control system features 131 (e.g., alarms, fire suppressing systems and emergency lighting).

With reference to FIG. 3, the facility 10 is occupied by multiple individuals at any given time and it is assumed that most if not all of those individuals possess some type of a portable or mobile computing device 20 that is coupled with the tool. For those individuals who do possess such a portable or mobile computing device 20, the term "user" will apply. Thus, the facility 10 is occupied by multiple users at any given time.

As shown in FIG. 3, each portable or mobile computing device 20 may be provided as a smartphone, a tablet and/or a laptop. In any case, each portable or mobile computing device 20 includes a display unit 21, a memory 22 and a processor 23. The memory 22 of each of the portable or mobile computing devices 20 has executable instructions of a distributed application stored thereon, which, when executed, cause the corresponding processor 23 to communicate with the monitoring and control systems 13, to conduct a registration of the corresponding user and to display on the corresponding display unit 21 an interface 30.

The communications between the monitoring and control systems 13 and the processor 23 may be wired or wireless. In the latter case, the communications may be enabled by antennae or routing equipment provided throughout the facility 10 and complementary antenna and networking features provided within the portable or mobile computing device 20. The registration of the corresponding user may be conducted once the executable instructions of the distributed application are installed in the memory 22 and may include a recordation of an identification of the corresponding user (e.g., the corresponding user's ID tag, visitor tag or some other tag), an association between the identification and the user as well as an association between the identification and a graphical image that can be displayed in the interface 30.

Figure 4:
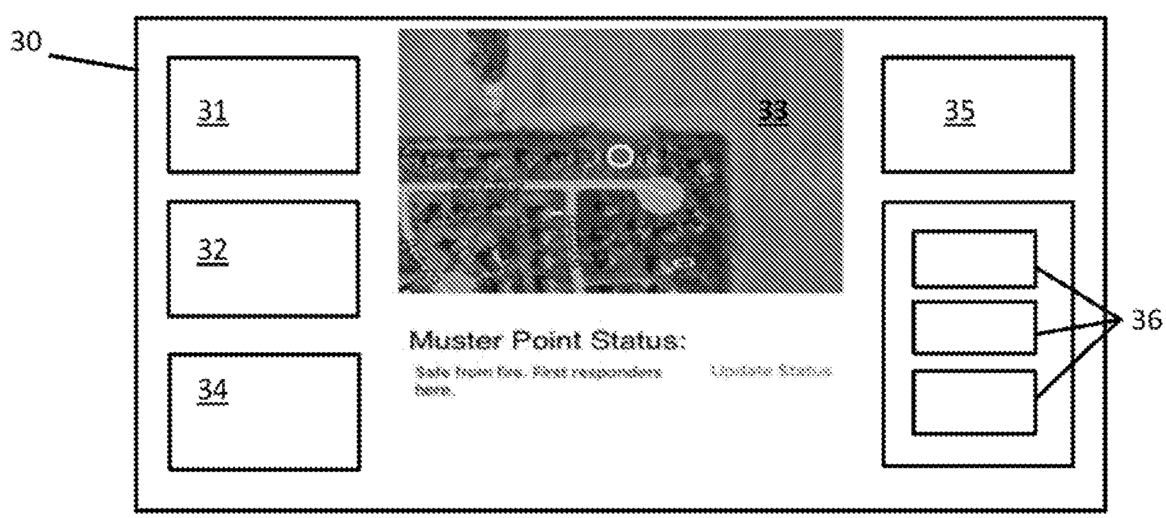
FIG. 4 is an illustration of an interface displayed on a display unit of the portable or mobile computing device of FIG. 3.
Figure 5:
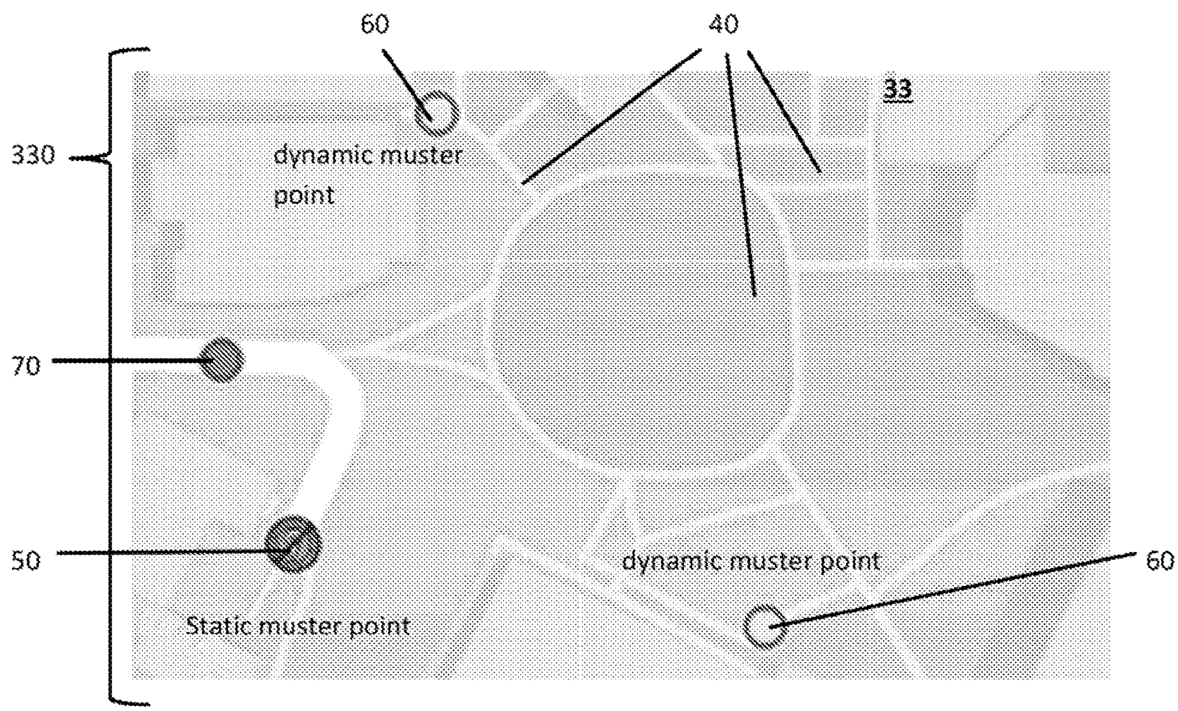
FIG. 5 is an illustration of a map of the interface of FIG. 4.

With reference to FIGS. 4 and 5, the interface 30 may be provided as a graphical user interface (GUI) and includes a first interface element 31, a second interface element 32 and a map 33 (see FIG. 4). The first interface element 31 allows the corresponding user to indicate his/her safety level and to state whether he/she is safe or in danger and/or whether be/she is healthy or injured. The second interface element 32 allows the corresponding user to self-identify as an emergency response team member or "mayor." As shown in FIG. 5, the map 33 (which is a different map from the map 33 of FIG. 4) includes first information 40, second information 50 and third information 60. The first information 40 is received from the monitoring and control systems 13 and includes structural data and environmental condition data. The second information 50 relates to predefined static muster points and the third information 60 relates to dynamic muster points of those users who have self-identified as mayors. In addition, for at least each of those users who has self-identified as a mayor, the map 33 may further include an illustration 70 of the identifications of other users at locations on the map 33 that correspond to actual locations of those other users.

In accordance with embodiments, the structural data of the first information may be reflective of and displayable as a floor or campus plan 330 in the map 33. The environmental condition data may relate specifically to the predefined static and dynamic muster points and relates to environmental conditions thereof (e.g., temperature levels, fire and smoke detection, etc.) as well as the conditions of the facility control systems (e.g., the engagement of fire suppressing systems, etc.). In any case, the environmental condition data may be displayable in the map 33 as guidance (e.g., the cross-out illustrated in FIG. 5) relative to the floor or campus plan 330 for the corresponding user. In addition, the second information may include a location of the predefined static muster points relative to the floor or campus plan 330 and the third information may include a location and a vector of the dynamic muster points relative to the floor or campus plan 330.

With reference back to FIG. 4 and in accordance with further embodiments, for at least each of those users who have self-identified as a mayor, the interface 30 may further include a third interface element 34, a user check-in element 35 and user-mayor, mayor-mayor and mayor-first responder communication engaging elements 36. The third interface element 34 allows a mayor who is capable of doing so to state whether he/she has access to first aid equipment. The user check-in element 35 allows mayors to check in other users at predefined static or dynamic mustering points. The user-mayor, mayor-mayor and mayor-first responder communication engaging elements 36 allows the corresponding user/mayor to initiate or participate in communications between various individuals (e.g., other users, other mayors or first responders).

Figure 6:
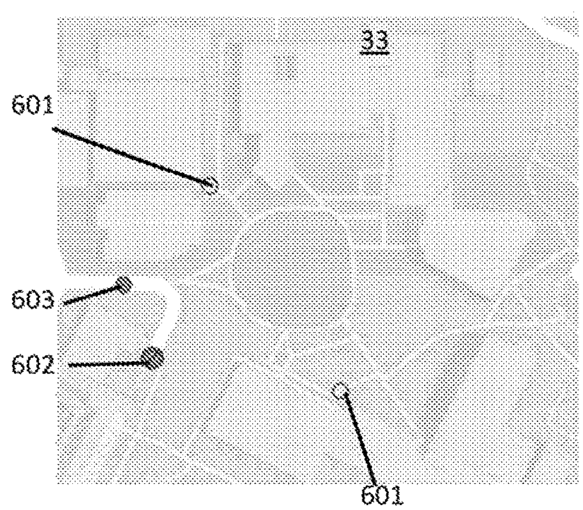
FIG. 6 is an illustration of an instance of a map of the interface of FIG. 4 at an initial time.
Figure 7:
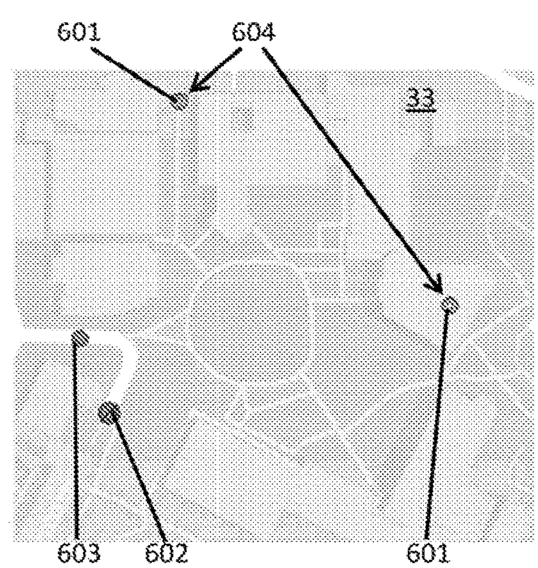
FIG. 7 is an illustration of an instance of a map of the interface of FIG. 4 at an intermediate time.
Figure 8:
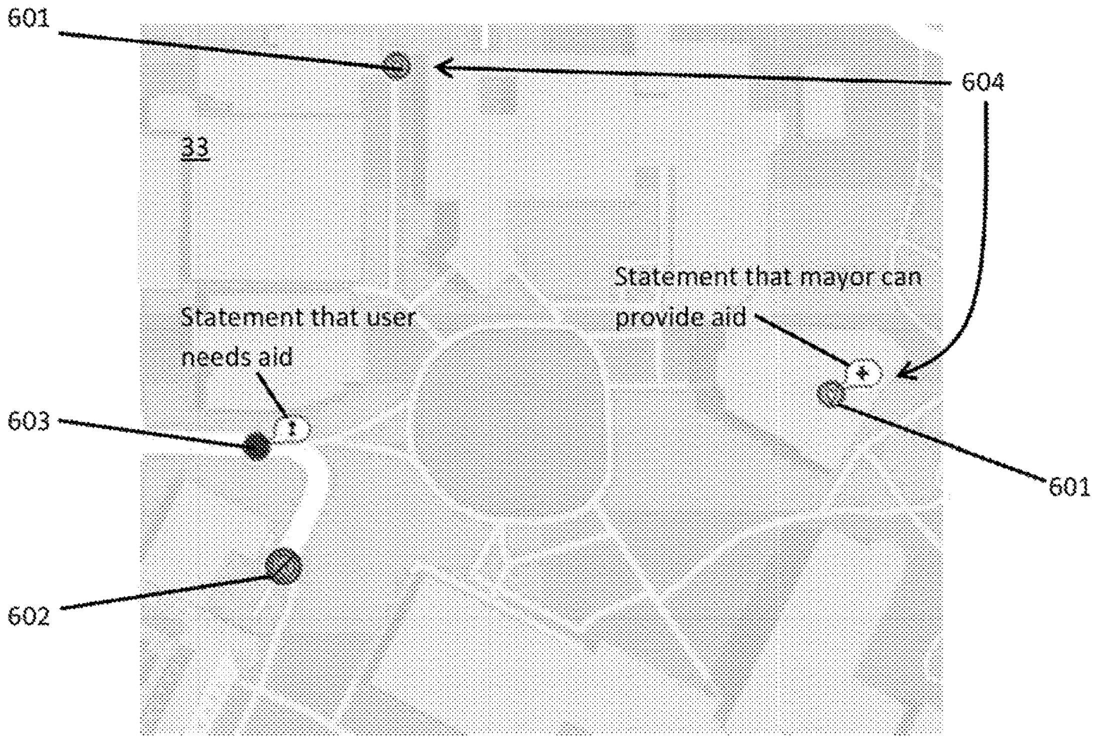
FIG. 8 is an illustration of an instance of a map of the interface of FIG. 4 at a late time.

With reference to FIGS. 6-8, an instance of the map 33 of the interface 30 is provided at an initial time (see FIG. 6), an intermediate time (see FIG. 7) and a late time (see FIG. 8). As shown in FIG. 6, users designated as (or who self-identify as) mayors 601 can see on the map 33 that the first predefined static muster point 602 is not safe as it is overwritten by a cross-out. The mayors 601 are thus made aware that they need to find a new location that is safe for mustering for themselves and the other user 603 on the map 33 so they proceed toward potential safe locations. Once in those safe locations, the mayors 601 can identify the safe locations as dynamic muster points 604 as shown in FIG. 7. As this goes on or subsequently, the other user 603 can use the first interface element 31 of his interface 30 to indicate that he is injured or unsafe and at least one of the mayors 601 can use the third interface element 34 of their interface 30 to state whether he/she has access to first aid equipment. In the case of FIG. 8 where only one of the mayors 601 made such a statement, this will prompt the other user 603 to proceed towards that one mayor 601 if possible.

Figure 9:
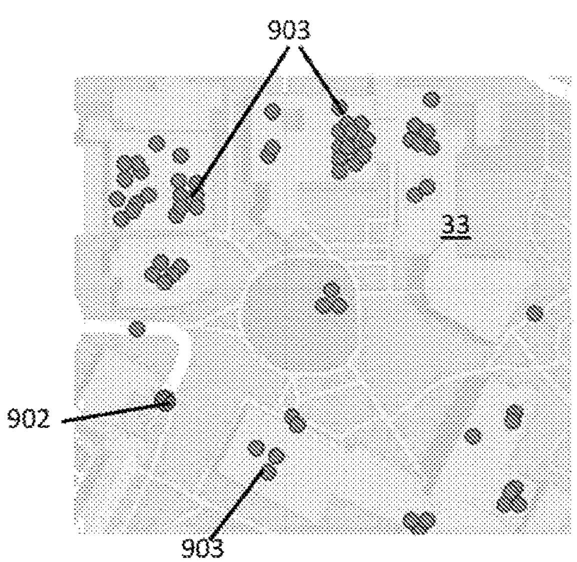
FIG. 9 is an illustration of an instance of a map of the interface of FIG. 4 at an initial time.
Figure 10:
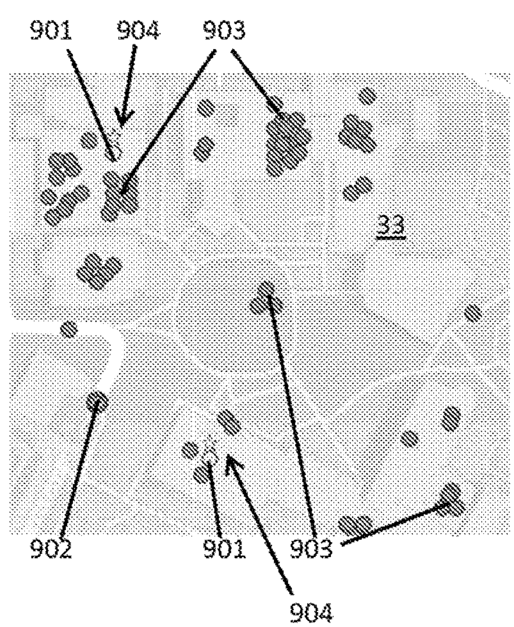
FIG. 10 is an illustration of an instance of a map of the interface of FIG. 4 at an intermediate time.
Figure 11:
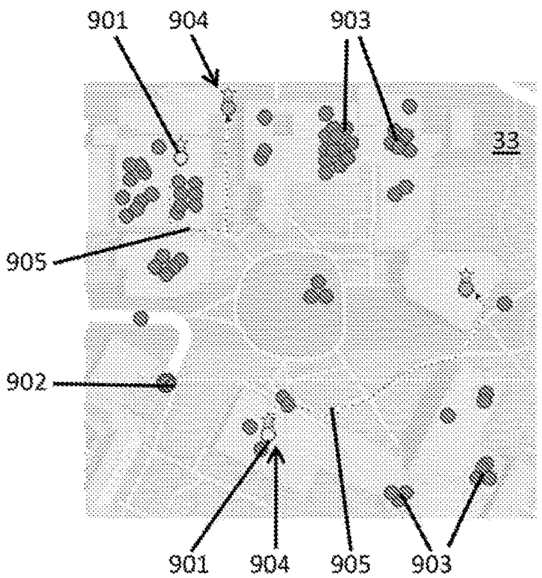
FIG. 11 is an illustration of an instance of a map of the interface of FIG. 4 at an intermediate time.
Figure 12:
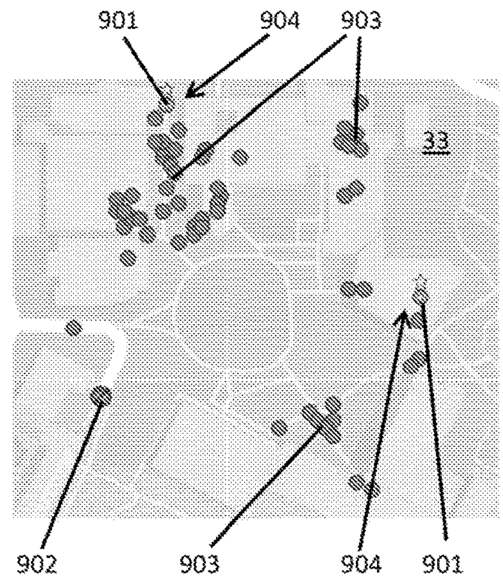
FIG. 12 is an illustration of an instance of a map of the interface of FIG. 4 at an intermediate time.
Figure 13:
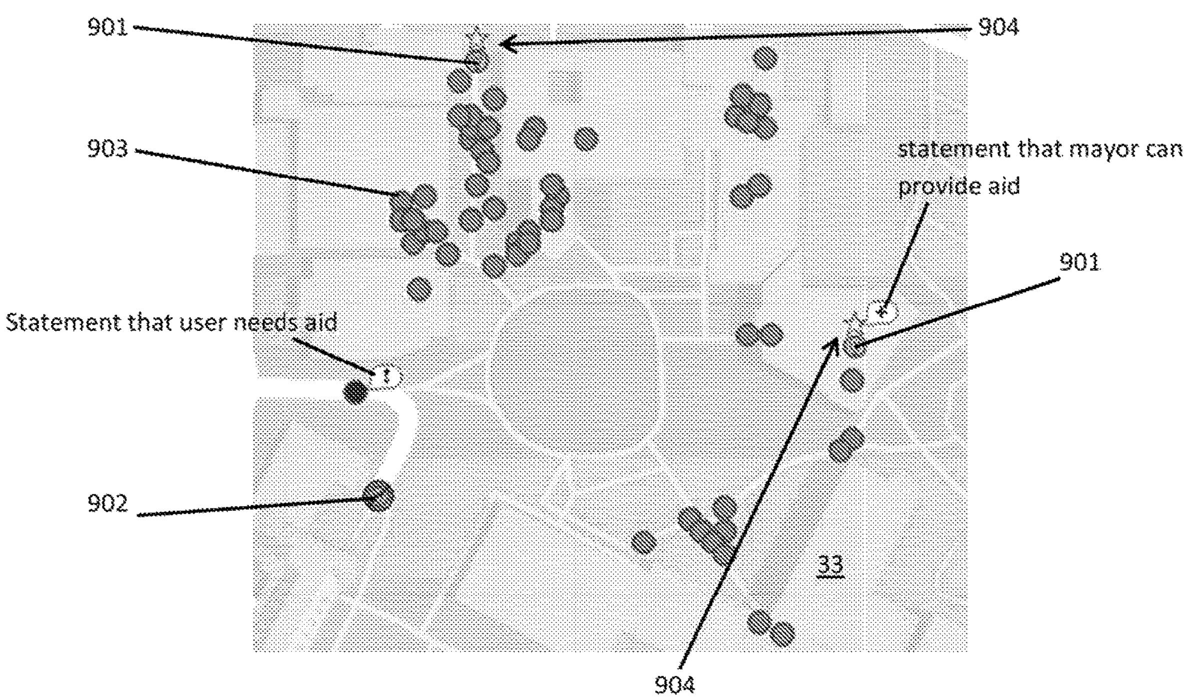
FIG. 13 is an illustration of an instance of a map of the interface of FIG. 4 at an intermediate time.
Figure 14:
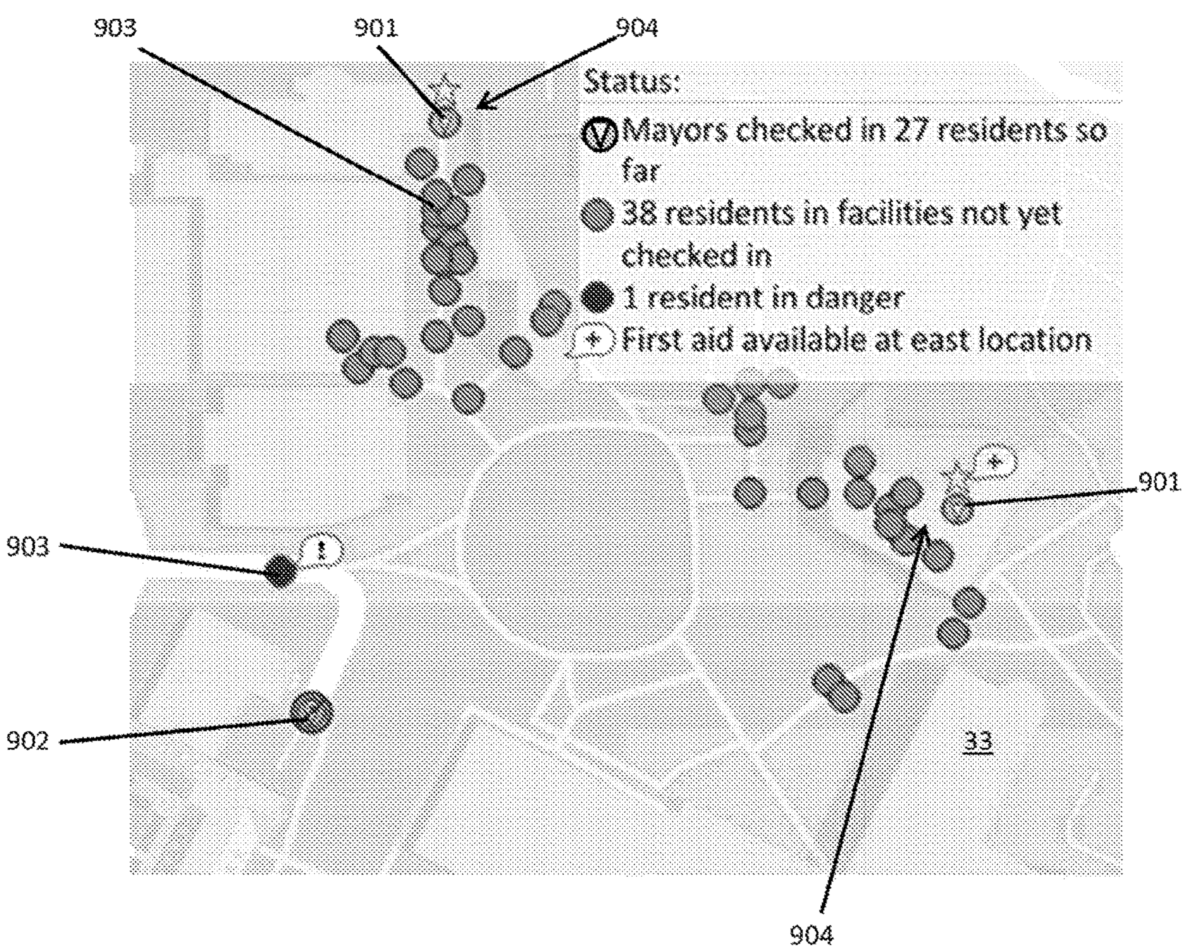
FIG. 14 is an illustration of an instance of a map of the interface of FIG. 4 at a late time.

With reference to FIGS. 9-14, another instance of the map 33 of the interface 30 is provided at an initial time (see FIG. 9), intermediate times (see FIGS. 10-13) and a late time (see FIG. 14). As shown in FIGS. 9 and 10, users who self-identify as (or who are designated as) mayors 901 can see on the map 33 that the first predefined static muster point 902 is not safe as it is overwritten by a cross-out. The mayors 901 are thus made aware that they need to find a new location that is safe for mustering for themselves and the other users 903 on the map 33 so they proceed toward potential safe locations. Once in those safe locations, the mayors 901 can identify the safe locations as dynamic muster points 904 as shown in FIG. 10 even while the mayors 901 continue to move as illustrated by their respective vectors 905 in FIG. 11. The other users 903 begin to muster toward the mayors 901 as shown in FIGS. 12, 13 and 14. As this goes on or subsequently, the other users 903 can use the first interface element 31 of his interface 30 to indicate that they are injured or unsafe and at least one of the mayors 901 can use the third interface element 34 of their interface 30 to state whether he/she has access to first aid equipment as shown in FIGS. 13 and 14. In the case of FIG. 14 where only one of the mayors 901 made such a statement, this will prompt the other user 903 in need of assistance to proceed towards that one mayor 901 if possible. Finally, as shown in FIG. 14, the mayors 901 can check-in those other users 903 who have reached the dynamic muster points 904 and will be able to see who hasn't checked in yet or who needs further assistance.

The description provided above relates to a mustering solution that solves several of the shortcomings of current mustering systems. Rather than having a single, static mustering point, the mustering solution provides for multiple moving or dynamic mustering points and residents are able to respond to the dynamic nature of the emergency. The mustering solution leverages common and pervasive hardware rather than using a customized and uncommon badge reader. In addition, by using portable computing devices or smartphones to organize mustering, residents and mustering points are able to share location information, safety status, photos of the situation, etc. Moreover, by using the portable computing devices or smartphones for check-in, a mayor has a real-time view of who is still in the facility and where they are. This information can be shared with first responders, guiding rescue or mitigation efforts.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A tool for supporting mustering in a facility, the tool comprising:

a mobile computing device comprising a display unit, a memory and a processor, the memory having executable instructions of an application stored thereon, which, when executed, cause the processor to communicate with monitoring and control systems of the facility, to conduct a registration of the user of the mobile computing device and to display on the display unit a graphical user interface (GUI) that comprises:

a first interface element displayed in a first display portion of the (GUI) by which the user interacts with the first display portion of the GUI and thereby indicates his/her safety level;

a second interface element displayed in a second display portion of the GUI by which the user interacts with the second display portion of the GUI and thereby self-identifies as a mayor; and a map displayed in a third display portion of the GUI, the map comprising first information received from the monitoring and control systems, second information relating to predefined static muster points and third information relating to dynamic muster points of users self-identifying as mayors, wherein the first, second and third display portions of the GUI are cross-sectionally distinct in that the cross-sectional area of each of the first, second, and third display portions of the GUI do not overlap with one another.

2. The tool according to claim 1, wherein the mobile computing device comprises a smartphone, a tablet and a laptop.

3. The tool according to claim 1, wherein the mobile computing device is plural in number and is provided as at least one mobile computing device for each user in the facility.

4. The tool according to claim 1, wherein the registration of the user comprises a recordation of identification thereof.

5. The tool according to claim 4, wherein, for each user self-identifying as a mayor, the map further comprises an illustration of the identifications of other users at map locations corresponding to actual locations thereof.

6. The tool according to claim 1, wherein the first interface element allows the user to indicate his/her danger level and health status.

7. The tool according to claim 1, wherein the first information comprises:

structural data which is displayable in the map as a plan of the facility in the map; and environmental condition data of the predefined static and dynamic muster points which is displayable in the map as guidance relative to the plan for the user.

8. The tool according to claim 7, wherein:
the second information comprises a location of the predefined static muster points relative to the plan, and
the third information comprises a location and a vector of the dynamic muster points relative to the plan.

9. The tool according to claim 1, wherein, for at least each user self-identifying as a mayor, the GUI further comprises:
a user check-in element displayed in a fourth display portion of the GUI by which the user interacts with the fourth display portion of the GUI and thereby checks in; and
user-mayor, mayor-mayor and mayor-first responder communication engaging elements displayed in a fifth display portion of the GUI by which user-mayor, mayor-mayor and mayor-first responder communications are enabled,
wherein the first-fifth display portions of the GUI are cross-sectionally distinct.

10. A tool for supporting dynamic mustering in a facility having monitoring and control systems, the tool comprising:
multiple mobile computing devices respectively comprising a display unit, a memory and a processor,
the memory of each of the multiple mobile computing devices having executable instructions of a distributed application stored thereon, which, when executed, cause the corresponding processor to communicate with the monitoring and control systems, to conduct a registration of the corresponding user and to display on the corresponding display unit a graphical user interface (GUI) that comprises:
a first interface element displayed in a first display portion of the GUI by which the corresponding user interacts with the first display portion of the GUI and thereby indicates his/her safety level;
a second interface element displayed in a second display portion of the GUI by which the corresponding user interacts with the second display portion of the GUI and thereby self-identifies as a mayor; and
a map displayed in a third display portion of the GUI, the map comprising first information received from the monitoring and control systems, second information relating to predefined static muster points and third information relating to dynamic muster points of users self-identifying as mayors,
wherein the first, second and third display portions of the GUI are cross-sectionally distinct in that the cross-sectional area of each of the first, second, and third display portions of the GUI do not overlap with one another.

11. The tool according to claim 10, wherein the multiple mobile computing devices comprise smartphones, tablets and laptops.

12. The tool according to claim 10, wherein the registration of the corresponding user comprises a recordation of identification thereof.

13. The tool according to claim 12, wherein, for each user self-identifying as a mayor, the map further comprises an illustration of the identifications of other users at map locations corresponding to actual locations thereof.

14. The tool according to claim 10, wherein the first interface element allows the corresponding user to indicate his/her danger level and health status.

15. The tool according to claim 1, wherein the first information comprises:
structural data which is displayable in the map as a plan of the facility in the map; and
environmental condition data of the predefined static and dynamic muster points which is displayable in the map as guidance relative to the plan for the corresponding user.

16. The tool according to claim 15, wherein:
the second information comprises a location of the predefined static muster points relative to the plan, and
the third information comprises a location and a vector of the dynamic muster points relative to the plan.

17. The tool according to claim 10, wherein, for at least each user self-identifying as a mayor, the GUI further comprises:
a user check-in element displayed in a fourth display portion of the GUI by which the user interacts with the fourth display portion of the GUI and thereby checks in; and
user-mayor, mayor-mayor and mayor-first responder communication engaging elements displayed in a fifth display portion of the GUI by which user-mayor, mayor-mayor and mayor-first responder communications are enabled,
wherein the first-fifth display portions of the GUI are cross-sectionally distinct.

18. A method of supporting mustering in a facility, the method comprising:
engaging communications with monitoring and control systems of the facility;
registering users in the facility; and
displaying a graphical user interface (GUI) on mobile computing devices of the users such that each displayed GUI comprises:
a first interface element displayed in a first display portion of the GUI by which the corresponding user interacts with the first display portion of the GUI and thereby indicates his/her safety level;
a second interface element displayed in a second displayed portion of the GUI by which the corresponding user interacts with the second display portion of the GUI and thereby self-identifies as a mayor; and
a map displayed in a third display portion of the GUI, the map comprising first information received via the communications with the monitoring and control systems, second information relating to predefined static muster points and third information relating to dynamic muster points of users self-identifying as mayors,
wherein the first, second and third display portions of the GUI are cross-sectionally distinct in that the cross-sectional area of each of the first, second, and third display portions of the GUI do not overlap with one another.

19. The method according to claim 18, wherein:
the first information comprises structural data which is displayable in the map as a plan of the facility in the map and environmental condition data of the predefined static and dynamic muster points which is displayable in the map as guidance relative to the plan for the user,
the second information comprises a location of the predefined static muster points relative to the plan, and
the third information comprises a location and a vector of the dynamic muster points relative to the plan.

20. The method according to claim 18, wherein, for at least each user self-identifying as a mayor, the GUI further comprises:

a user check-in element displayed in a fourth display portion of the GUI by which the user interacts with the fourth display portion of the GUI and thereby checks in; and user-mayor, mayor-mayor and mayor-first responder communication engaging elements displayed in a fifth display portion of the GUI by which user-mayor, mayor-mayor and mayor-first responder communications are enabled, wherein the first-fifth display portions of the GUI are cross-sectionally distinct.

* * * * *